April 28, 1959     A. CLAUD-MANTLE     2,884,275
HOOD LATCH Filed May 6, 1954     6 Sheets-Sheet 1

INVENTOR
A. Claud-Mantle
BY
ATTORNEYS

April 28, 1959 A. CLAUD-MANTLE 2,884,275
HOOD LATCH
Filed May 6, 1954 6 Sheets-Sheet 3

INVENTOR
A. Claud-Mantle
BY
ATTORNEYS

April 28, 1959   A. CLAUD-MANTLE   2,884,275
HOOD LATCH
Filed May 6, 1954   6 Sheets-Sheet 4

INVENTOR
*A. Claud-Mantle*
BY *Rockwell & Bartholow*
ATTORNEYS

April 28, 1959 — A. CLAUD-MANTLE — 2,884,275
HOOD LATCH
Filed May 6, 1954 — 6 Sheets-Sheet 5

INVENTOR
A. Claud-Mantle
BY Rockwell & Bartholow
ATTORNEYS

# United States Patent Office 2,884,275
Patented Apr. 28, 1959

2,884,275
HOOD LATCH

Arthur Claud-Mantle, Trumbull, Conn., assignor, by mesne assignments, to Stewart-Warner Corporation, Chicago, Ill., a corporation of Virginia Application May 6, 1954, Serial No. 427,996

11 Claims. (Cl. 292—52)

This invention relates to hood latches for automobiles, and more particularly to those of the alligator type in which the parts of the latch are carried by the forward end portion of the lid and a lower fixed part adjacent a grille at the forward end of the engine enclosure, the latch being releasable by a releasing member accessible at the grille portion.

An object of the invention is to provide a latch having improved and effective provisions by which the lid is pre-centered and guided as it is being lowered so that the lid moves to the correct position before the latching action takes place.

Another object is to provide an improved form and arrangement of centering member or housing projecting toward the post-like keeper or plunger for piloting or guiding the latter as the latch parts move toward the latched position.

Another object is to provide a centering or piloting member adapted to give full enclosure to the keeper, said member being of hollow rectangular cross section and equipped with primary and secondary levers co-operating with the keeper for latching the lid in the fully latched and safety positions, respectively.

A further purpose of the invention is to provide new and useful forms of keeper or plunger for use with latches of the alligator type.

A further aim of the invention is to provide a simple, effective form of hood latch of the alligator type involving pre-centering members which effectively guide the lid to the correct position for latching, and obviate damage to the car, and also involving primary and secondary catches swinging in vertical planes and releasable by a releasing lever swingable in a vertical plane.

Further aims are to provide very effective holding and latching arrangements for the primary latching means which will enable the keeper or plunger to be held very securely and to provide reliable and effective means for holding the lid in partially released (safety catch) position.

In the form shown by way of example in Figs. 1 to 10, inclusive, the assembly includes a depending rigid keeper in the form of a post or plunger of channeled cross section carried by the forward end of the lid, the back or bottom wall of the channel being faced toward one side of the hood and being provided with a vertically extending slot, said slot being adapted to coact with primary and secondary latching members mounted from the lower fixed part of the engine enclosure. As a part of the latch mechanism there is provided a lifting spring for the lid acting on a stem mounted upon the lower member of the hood, said stem being movable upwardly to engage a wall at the lower end of the keeper and push the keeper in an upward direction, as hereinafter more particularly described. The lower member of the latch, instead of including a main latch plate into which the keeper is projected, is in the form of an upwardly projecting guiding or piloting member or housing fully enclosing the keeper laterally for the purpose of centering the same before the latching action takes place. This particular piloting member or housing is supported at its lower end on a carrying member provided upon the lower part of the enclosure, and in cross section it is rectangular so as to accommodate and guide the channeled keeper. At one side of the piloting housing, which is preferably made of sheet metal, the housing is extended to accommodate the primary latching lever that co-acts with the vertical slot in the keeper in the manner hereinafter described. The portion of the piloting housing which accommodates this primary lever also accommodates a secondary or safety-catch lever alongside the primary lever, and the safety-catch lever is also adapted to co-act with the slot in the keeper. Both of these latching levers are swingable with respect to a common pivot member mounted at the upper part of the piloting housing. These latching levers are provided with springs extended between the upper parts of the levers and lower fixed parts of the piloting housing. Movement of the levers against the action of the respective springs can be produced by a manually manipulable releasing lever including in its structure a yoke portion pivoted upon the lower part of the piloting housing and carrying means adapted to move the primary and secondary latch levers in the manner hereinafter described.

The yoke portion of the releasing lever embraces the lateral extension of the pilot housing in which the primary and secondary latch levers are mounted. The springs acting on these latch levers urge them into positions in which portions of these levers extend from the lateral extension of the pilot housing through the vertical slot in the keeper for the purpose of limiting vertical movement of the keeper, but by actuation of the releasing lever these levers can be withdrawn from the path of the keeper for the release of the keeper from the latching position and the safety-catch position, as hereinafter described. A handle extension from the yoke part of the releasing lever projects generally forwardly into a slot in the grille by way of which it is accessible for manipulation.

The piloting housing has lower flanges or foot portions by means of which it is secured to a carrier plate provided on the lower fixed hood member, this carrier plate being sandwiched between the piloting member and another plate laid against the under surface of the carrier plate. The mounting plate just referred to has associated with it and supports a depending case within which is mounted the spring-pressed slidable stem or plunger above referred to, which, when the keeper is released, pushes the keeper, and thereby the lid, upwardly to a certain extent.

The keeper of channeled cross section has integral therewith at the upper part lateral extensions used in attaching the same to the hood lid. In this particular case an upper carrier plate extending transversely of the hood is sandwiched between the upper end of the keeper and a suitable mounting plate, this structure being similar to that employed at the lower end of the piloting housing.

In the drawings, the rearwardly hinged hood lid is indicated at 25, the grille at the forward end of the hood at 26, the latch device in general at 27, the carrying plate within the upper part of the lid at 28, the carrying plate fixed to the lower stationary part of the hood at 29, the rigid keeper of channeled cross section at 30, the lower latch member generally at 31, the upwardly projecting piloting member or housing at 32, the primary latching lever at 33, the safety-catch lever at 34, the pivoted yoke portion of the releasing lever at 35, the manipulating rod or handle portion of the releasing lever at 36, the foot portion of the piloting housing at 37, the mounting plate applied to the lower surface of carrier plate 29, at 38, the lid-lifting stem at 39, and the casing containing this stem and attached to the plate 38, at 40.

Referring first to the keeper 30, this is of channel shape in cross section, with the channel facing toward one side of the hood, the back of the channel having for the greater part of its length the vertical slot 41. Extending to the right and left of the keeper at the upper end thereof (Fig. 3) are integral portions 42 and 43, providing flanges or lugs by means of which the keeper is secured to the carrier plate, the latter being sandwiched between the top of the keeper and a mounting plate 44, the plate 44 and the keeper flanges being interconnected by suitable screws, this type of sandwich mounting being similar to that disclosed in my application Serial No. 396,215, filed December 4, 1953.

At the lower end of the keeper the channel is walled off by an integral bent-up horizontal wall 45 presenting a smooth horizontal surface to engage the upper extremity of the lid-lifting stem 39, the lower surface of this bottom wall being flush with the lowermost edges of portions of the side walls of the channel. Preferably, as indicated in the drawings, the lateral dimension of the bottom wall is somewhat less than the depth of the channel. Portions of the side walls of the channel which project downwardly in front of the wall 45 are indicated at 47.

Figure 1:
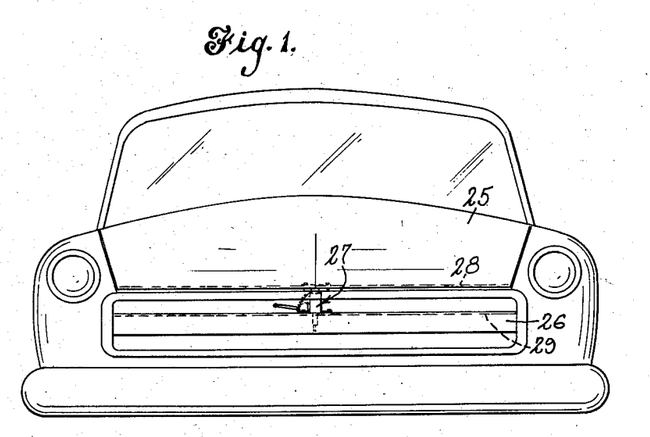
Fig. 1 is a partial front elevation of an automobile equipped with a hood latch embodying the invention.
Figure 2:
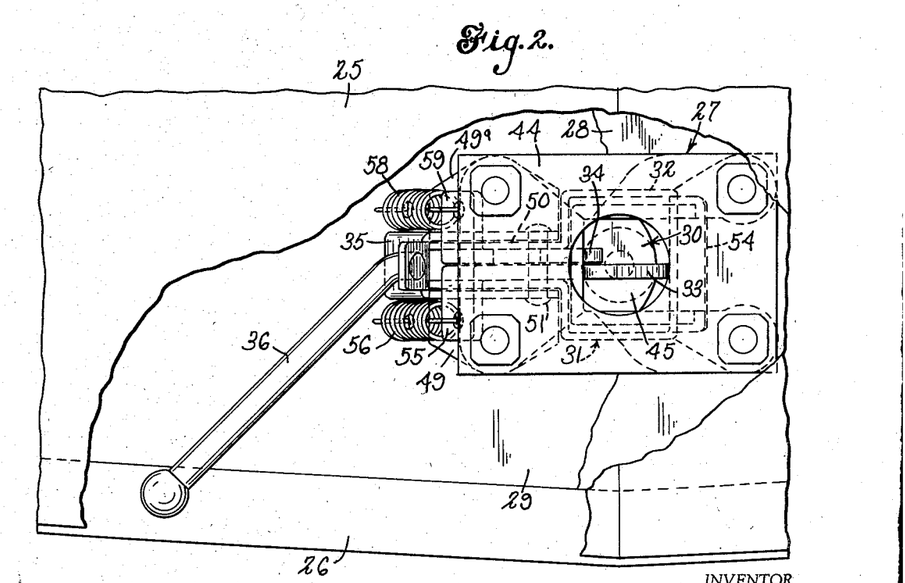
Fig. 2 is a fragmentary top plan view, with parts broken away, of the hood and its latch mechanism, the lid being in the latched position.
Figures 3, 4:
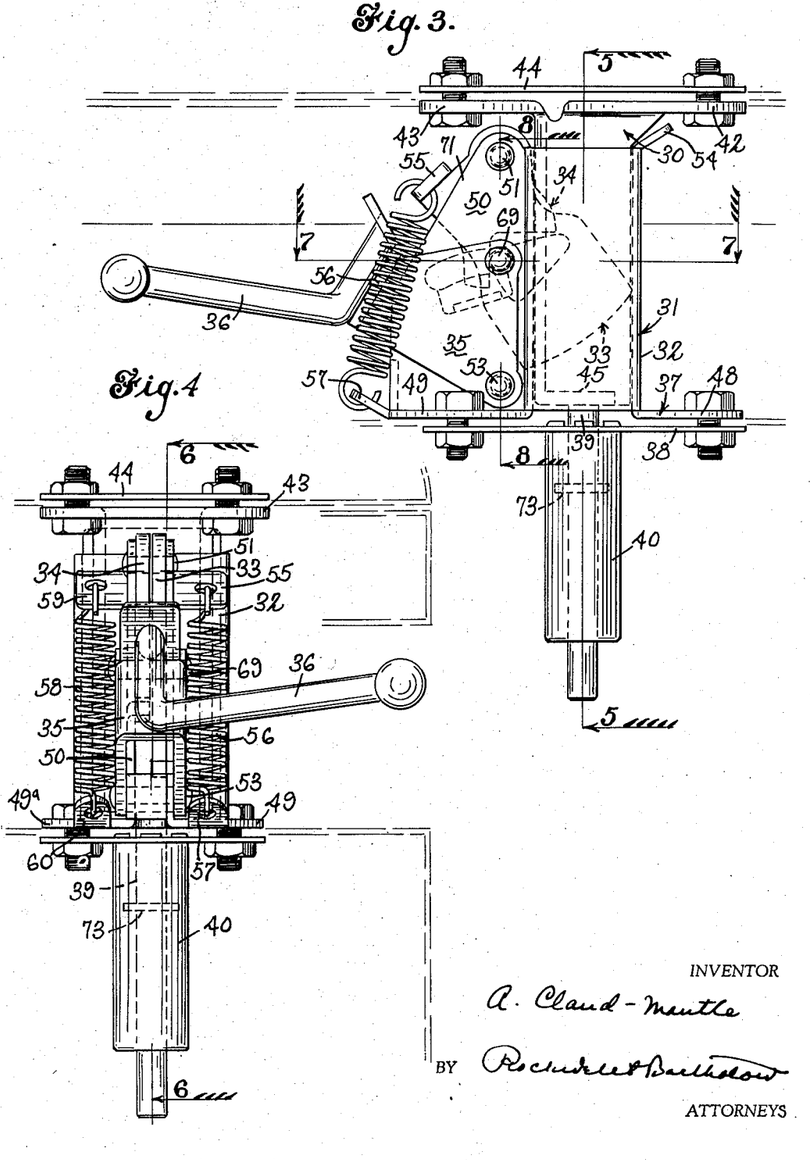
Fig. 3 is an elevation of the latch mechanism looking from the front end of the car.
Fig. 4 is a side elevation of the latch.
Figure 5:
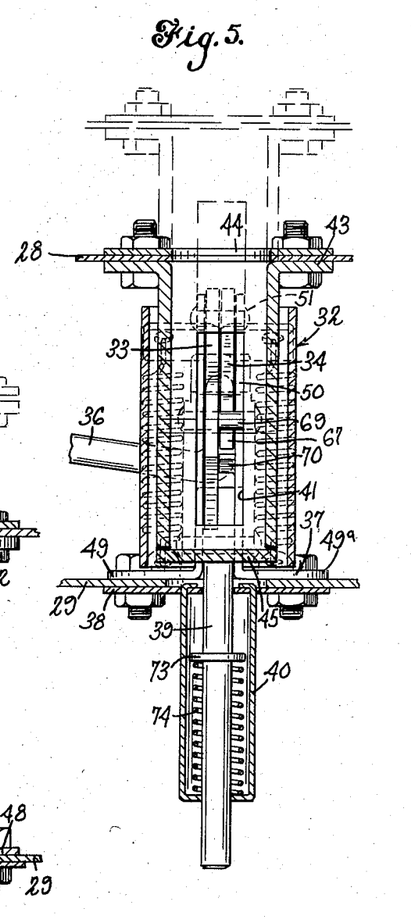
Fig. 5 is a section on line 5—5 of Fig. 3.

Taking up next the structure of the piloting member or housing 32, this is a sheet metal member provided with the foot portion 37 which comprises a base lug 48 extending to the right (Fig. 3) and a base lug 49 extending to the left, these lugs being attached to the lower carrier plate by means such as disclosed in the copending application mentioned above. The piloting housing was a body which is rectangular in cross section with slightly rounded corners, the housing being open at the bottom as well as at the top, and this housing has, as an integral part thereof, a narrow lateral extension 50 approximately coextensive in height with the body of the housing. This extension encloses the latching levers 33 and 34, which are pivoted within the extension at the upper end thereof by means of a common pivoting pin 51 which extends between and interconnects the side walls of the extension. The yoke portion 35 of the releasing lever is extended over the extension 50, and is pivoted to this part by a pin 53. The yoke is made of a piece of sheet metal bent into U shape, and the pivot pin 53 passes through the terminals of the U and through perforations in the side walls of the extension near the lower end of the latter. The manipulating rod or handle 36 is suitably connected to the intermediate or connecting part of the U in a suitable manner as by welding, and the handle is arranged at an angle to the planes in which the levers 33 and 34 swing so that the end of the handle is accessible by way of a slot in the grille, as shown in Figs. 1 and 2.

The rectangular cross section of the piloting housing is so arranged that the keeper operates in a well or chamber that is somewhat elongated lengthwise of the hood, there being sufficient clearance for the front and rear parts of the keeper to allow for the pivoting of the hood lid at the rear of the latter. In a transverse direction with respect to the hood, the open or mouth portion of the keeper channel and the back portion of this channel are close to the opposing portions of the piloting housing in order that the lid when fully closed will have its forward end portion correctly positioned transversely of the hood.

For the purpose of centering and guiding the keeper, and thereby the lid, transversely of the hood, the upper end of the piloting housing has a flaring formation to facilitate the entrance of the lower end of the keeper into the latch structure. In the form shown, there is at the right side of the housing 32 an inclined flange 54 (Fig. 6) adapted to contact the lower end of the keeper, and at the left side of the housing the upper ends of the levers 33 and 34, together with the upper end of the extension 50, are rounded so as to provide in effect a keeper-centering member complementary to the flange 54. The cross section of the lower end of the keeper is substantially rectangular so that the pilot housing can conform to it rather closely for effective guiding and centering.

Figure 7:
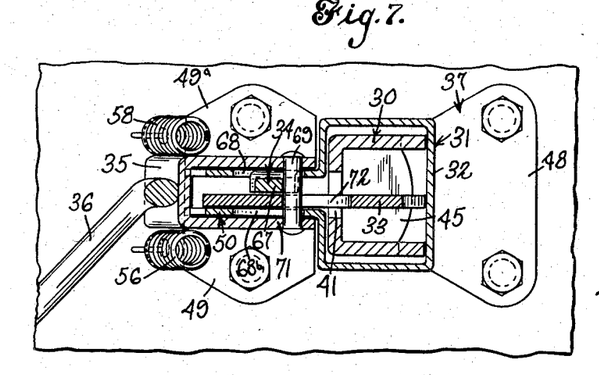
Fig. 7 is a section on line 7—7 of Fig. 3.
Figure 7A:
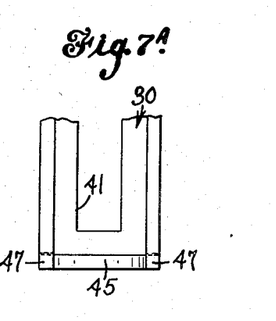
Fig. 7A is a detail view of the lower part of the keeper.

Of the latching levers 33 and 34, which are arranged to swing in parallel planes, the former is disposed toward the front end of the car, as shown in Fig. 7, and lever 34 is disposed close to it at the rear, each being free to swing relatively to pivot 51 which is a fixed member. Lever 33 is provided at the upper part with a forwardly extending lug 55 connected by a helical spring 56 to a perforated ear 57 on the base lug 49 of extension 50. The function of the spring 56 will be pointed out hereinafter, also the effect of a similar spring 58 associated with the lever 34. The lever 34 is provided near its upper end with a rearwardly extending lug 59 to which the upper end of the spring 58 is connected, and the lower end of this spring is connected to a perforated ear 60 on a rearward base lug 49a.

Figure 6:
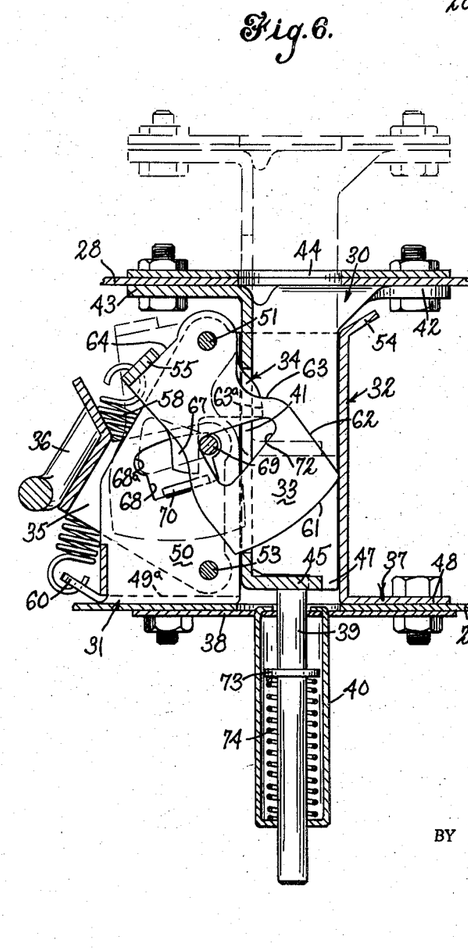
Fig. 6 is a section on line 6—6 of Fig. 4.
Figure 9:
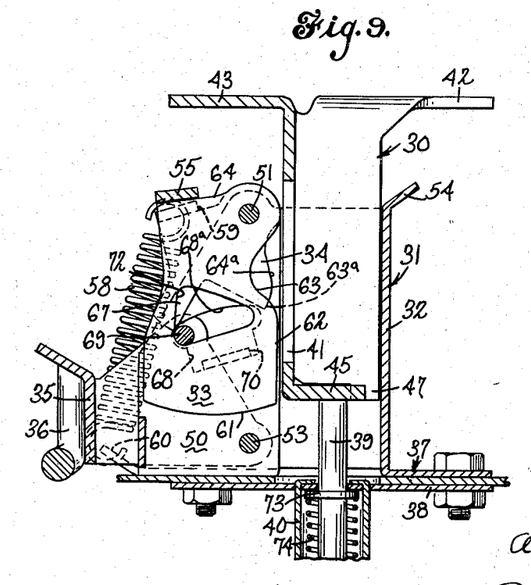
Fig. 9 is a view generally similar to Fig. 6, showing the position of the parts when the keeper is released by action of the releasing lever.

The main latching lever 33 is a plate-like member lying in a single plane, the same having the contour shown in Figs. 6 and 9. This lever is adapted to have a pendant position such as shown in Fig. 9 wherein it is entirely disengaged from the keeper and removed from the keeper path, but it may have a latching position such as shown in Fig. 6 in which the lower part of it extends through the slot 41 in the keeper and engages the keeper adjacent the lower end of the slot for the purpose of holding the keeper in the latched position. In the position of Fig. 6, a convexly curved edge 61 at the lower end of the lever serves as a camming edge, as hereinafter described. To the right of this edge (Fig. 6), a straight edge portion 62 leads upwardly, and in adjacency to the upper end of the keeper slot the lever has a recessed edge portion 63 which affords clearance when the lever is in the latching position. Above the clearance recess 63, the lever terminates in a rounded portion through which the pivot pin 51 passes. To the left of the pivot pin (Fig. 6) the lever has a straight edge portion 64 from which the lug 55 extends. As shown in the drawings, the edge of the lever opposite the camming edge 61 is of approximately the same width as this camming edge.

Figures 10, 10A:
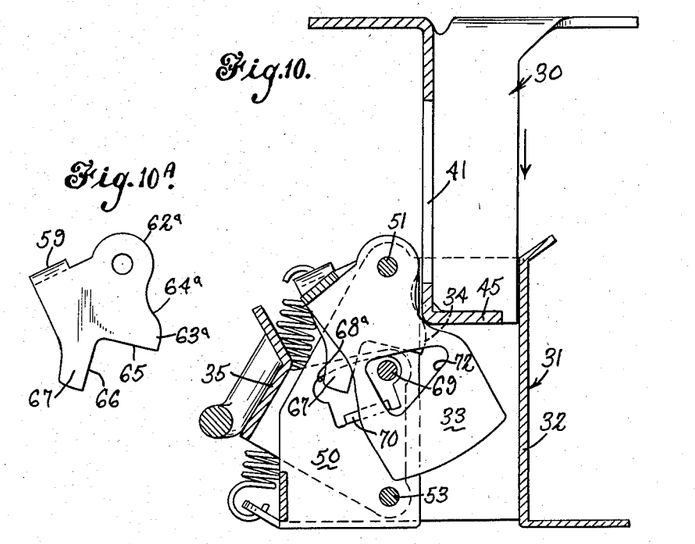
Fig. 10 is a view generally similar to Fig. 9, showing the position of the parts at one stage when the lid is being closed.
Fig. 10A is a detail of the safety-catch lever.
Figure 11:
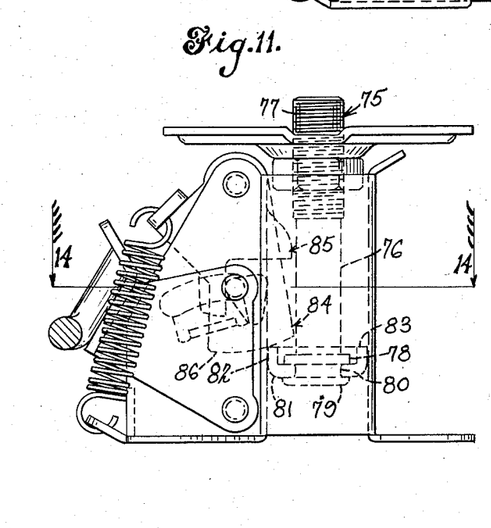
Fig. 11 is a front elevation of a modified form of latch, the latter being in the latched position.
Figure 12:
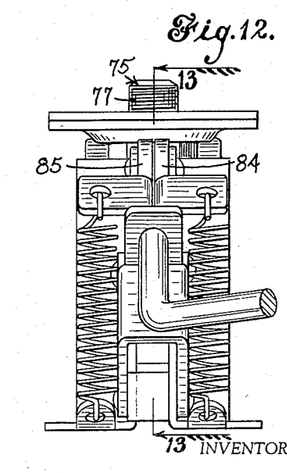
Fig. 12 is an elevation of this latch, looking toward the releasing lever.
Figure 13:
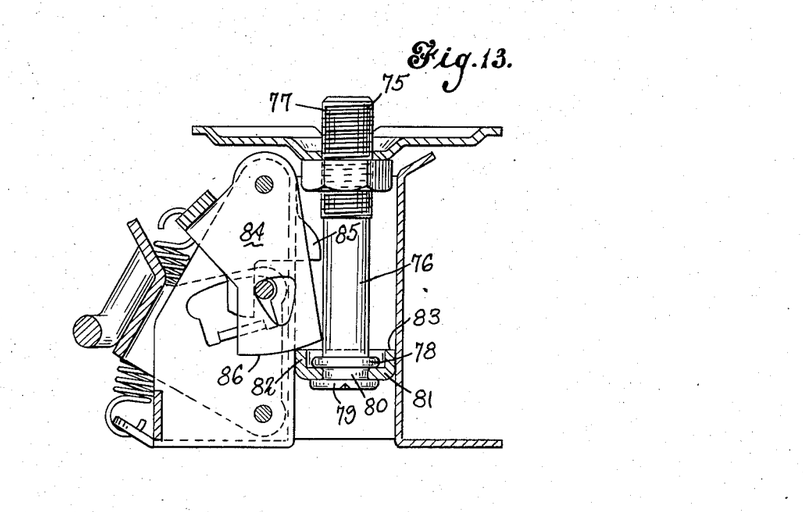
Figs. 13 and 14 are sections on lines 13—13 of Fig. 12, and 14—14 of Fig. 11.

Taking up next the contour of the safety-catch lever 34, this is shown in Fig. 10A. This lever is generally similar to lever 33, having a similar rounded upper end 62a, but it is considerably shorter than lever 33 having a nose portion 63a adapted to operate in the upper end portion of the slot 41 in the keeper. This nose portion 63a has a rounded upper formation 64a and a straight edge portion 65 at the lower part providing with another straight edge portion 66 an angular recess, this recess being adjacent a depending leg 67.

Figure 8:
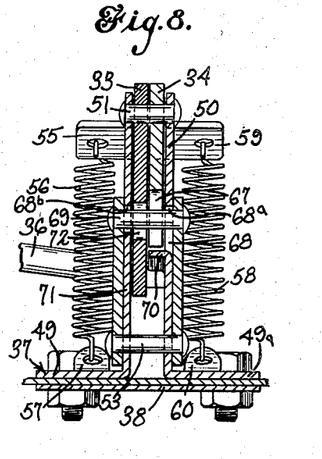
Fig. 8 is a section on line 8—8 of Fig. 3.

Referring to the side wall 50a of extension 50, which is located at the right of Fig. 8, and is also shown in Fig. 6, this wall is cut away or recessed so as to provide a clearance space 68 for a cross pin 69 mounted in the upper end of the yoke 35, and at the lower part of the recess is a lateral flange 70. This flange extends toward the lower part of the lever 33, as shown in Fig. 8 so as to provide a guide or positioning means for the lower end of this lever. Above the part of clearance space 68 from which the flange 70 is struck out is an arcuate slot portion 68a which provides clearance for the cross pin 69 when the yoke 35 is moved between latching and releasing positions. The opposite wall 71 of extension 50, located at the left of Fig. 8, is provided with an arcuate slot 68a which provides clearance for the movable cross pin 69 at that side. The cross pin 69 cooperates with the safety lever 34 by engaging the leg 67 of said lever when the swinging yoke is moved to releasing position, at which time the nose portion 63a of the lever is withdrawn from the path of the keeper. The cross pin 69 also acts as a releasing means for the primary lever 33 inasmuch as this pin engages the lever in a manner to move the latter out of the path of the keeper. This effect is produced by having a portion of the cross pin 69 disposed in a substantially triangular recess 72 in the lever. As shown in Fig. 6, the cross pin is engaged in one of the upper corners of the recess or aperture 72 so that upon downward swing of the yoke the lever 33 will be pulled to the releasing position of Fig. 9, in which position the cross pin is in a lower corner of the recess.

When the lid is in the latched position, the cross pin 69 is within the right-hand ends (Fig. 6) of the slot portions 68a and 68b, and when the lid is in the fully released position (Fig. 9) the cross pin is at the opposite ends of these slot portions. When the yoke member 35 is in the fully released position of the latch, the lower edge portion of the yoke abuts against the base lugs 49 and 49a of the piloting housing. The helical springs 56 and 58 acting respectively on the levers 33 and 34 normally hold these levers in their latching positions and the levers in turn act against the cross pin 69 to hold the latch-releasing lever in its upper position.

The lid-lifting stem 39 acting against the lower end of the keeper is of the structure and arrangement shown in my application, Serial No. 411,793, filed February 23, 1954, now Patent No. 2,834,626, the casing 40 being attached to the plate 38 at the upper end of the casing and the stem having a collar 73 within the casing acted upon by a helical spring 74. In the position shown in Fig. 9, where the latching mechanism is released, the stem will press the keeper upwardly until the collar 73 abuts the lower face of plate 38. At this point, the throw of the stem is arrested, but the keeper will have some further rise under the lifting impulse.

Fig. 6 shows the latching positions of the levers 33 and 34. The cam edge 61 of lever 33 is engaged with the lower edge portion of slot 41. Lever 33 having been swung to this position (Fig. 6) by counterclockwise movement, the lever cams the keeper downwardly as far as possible, energizing lid-lifting spring 74. This counterclockwise swing of lever 33 is limited or may be limited by a corner of the lever engaging the adjacent wall of the piloting member 32. The arrangement is such as to thrust the keeper downwardly to the maximum allowable extent through the cam action of the lever against the slotted rear wall of the keeper.

The lever 34 is active for limiting the upward movement of the keeper because, in this position (Fig. 6), the nose portion of the safety-catch lever is extended to the interior of the keeper, the same being in position in the upper end of the slot 41. The safety catch is therefore in position to arrest the lift of the keeper by engagement of the lower slotted portion of the keeper with the edge portion 65 of the safety-catch lever. A safety-catch position of the keeper is indicated by broken lines in Fig. 6. The safety-catch lever prevents full release of the keeper in case the lid, when closed down, is not fully secured or due to some cause escapes from the hold of the primary lever, and, in such case, the catch lever securely retains the keeper because of the fact that its nose portion is projected into the slot 41 so as to be in overlying relationship to the latching edge at the lower end of the slot in the keeper.

It will be understood that, in the latched position of the lid, the keeper will be above the lower carrying plate 29 in the lowermost portion of the box-like piloting structure, the keeper being urged upwardly by the lid-lifting spring by having a part of its back wall in camming or wedge-like engagement with an edge of the primary latching lever so that upward movement is prevented. Spaced upwardly from the lower end of the primary lever is a safety-catch portion of the secondary lever standing in a position to allow keeper lift to a higher level, i.e., to the safety-catch position referred to above.

It will be understood that, in the operation of the improved latch, the latch can be readily released by inserting the hand through the grille opening and swinging the manipulating part of the release lever downwardly. This will withdraw the primary lever from the latching position and out of the path of the keeper and if the release lever is given a sufficiently strong or full movement, the safety-catch lever will also be released. When the release lever is held at the limit of its swing both latch levers will be out of the keeper path. In the form of latch shown in the drawings, the latching part of the primary lever moves much more rapidly than the corresponding part of the short secondary lever, but the two levers reach the respective releasing positions at approximately the same time.

When the lid is being closed the box-like member 32 serves a very important function in precentering the lid and preventing damage to the side edges of the lid and in other places due to the misalignment of the lid at the time it is being closed. The upper end of the box-like or substantially tubular member receives and guides the keeper at a distance well above the latched position of the latter and guides the keeper effectively until the latched position is reached. Fig. 10 shows the position of the parts after the keeper has entered the upper portion of the well in the piloting member. In closing the lid, the lower end of the keeper forces the catch lever and the primary lever out of the way against the action of their springs and these levers then move into position in the slot 41, and as the primary lever is moved counterclockwise (Fig. 10) it exerts a strong camming effect on the keeper so as to depress the latter. Moreover, it will be noted that the primary lever has a camming edge of substantial length and that this lever upon entering the slot 41 will strongly resist any upward movement of the keeper even if the lever does not reach the fully swung position of Fig. 6. In the active position, the cam edge of the lever is inclined somewhat upwardly in a position where the camming edge or most of it is at one side of the vertical plane of lever pivot 51, and it will be apparent that upward pressure of the keeper from a position such as shown in Fig. 6 will tend to wedge the lever into an even more secure latching position.

The described arrangement of two latching levers and the releasing lever relatively to each other and to the housing portion is advantageous for several reasons. Among other things, only the two springs 56 and 58 are needed in this assembly, these springs serving to hold the releasing lever in antirattle relationship to the other parts. In this assembly, the common pivot for the levers is at the upper part of the housing, the pivot for the releasing lever is at the lower part, and the actuating cross pin of the releasing lever at an intermediate level. The springs are directly connected to the levers and the levers have lost-motion connection, as above described, with the releasing lever by which the latter is held normally in the position of Fig. 3. It is also to be noted that when the primary and secondary latch levers are in latched position, they are under compressive stress edgewise and cannot fail to function short of the destruction of these parts.

In the modified structure shown in Figs. 11 to 15, inclusive, the latch lever and releasing yoke structure is similar to that described above, a principal difference consisting in the use of a keeper having a round shank and a lower head of substantially square shape. In this case, the keeper 75 has a round shank 76 provided adjacent the upper end with a threaded portion 77 by means of which the keeper can be fastened in any desired manner to a carrier plate (not shown) provided within a hood member. Near the lower end of the keeper shank, the latter is formed with an integral collar or flange 78 and at the extreme lower end with a riveted flange or head 79, these flanges being annular members. Between the members 78 and 79 and securely held in an angular groove 80 between these members is a cupped member 81 which in plan is of substantially square shape with slightly rounded corners. This member 81 has a flat perforated bottom tightly clinched to the shank by staking or riveting over the member 79, and the cup-shaped member has a relatively shallow upstanding flange 82 presenting a squared off or flat upper edge 83. The corner between the side wall and the bottom wall of this cupped member is rounded off exteriorly, as appears from Fig. 13, so as to facilitate centering of the keeper in the pilot housing, which latter member is shown as substantially identical with that previously described.

By the arrangement just described, the shank-link or bolt-like keeper member is provided at the lower end with a composite head including a rigidly held cup provided with an upstanding flange. This cup guides the shank in the pilot housing and also coacts with the latch mechanism having primary and secondary levers adapted to hold or limit the movement of the keeper by overlying the upper edge of the cup in the position shown in Figs. 13 and 14.

Generally speaking, the primary lever 84 and the secondary lever 85 are similar to those previously described and their disposition in the lateral extension of the pilot housing is similar to that previously described. However, these levers have considerably less swing than in the form first described. Lever 84 has a straight edge at the right-hand side (Fig. 13) and a convex lower arcuate edge 86. In the latched position shown in Fig. 13, the edge 86 overhangs the upper edge of the cup element 81 at an angle and upward pressure on the keeper serves to increase the security of the fastening as in the form first described. The action of this latch in releasing the lid is similar to that of the latch first described, and the action of the safety lever 85 in limiting the upward movement of the keeper will be apparent, the coacting element being the upper edge of the cup.

It will be apparent that, in this form, the action of the primary lever in latching the keeper will be such as to press the opposite side of the composite bolt head against the opposed wall of the pilot housing chamber or well, which increases the security of the fastening.

With this form of keeper, the cup member which coacts with the latching levers and with the pilot housing may readily be hardened to the desired degree before assembly thereof with the keeper shank.

Figure 14:
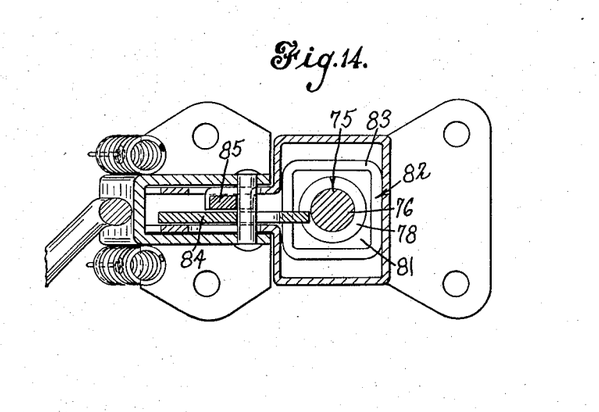
Figure 15:
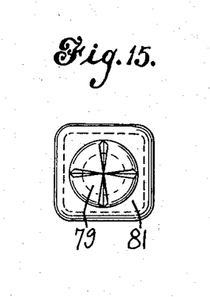
Fig. 15 is a bottom plan view of the keeper used in this form of latch.

In this form as in the first form the keeper-receiving well or opening in the housing is elongated lengthwise of the hood, as appears from Fig. 14, so as to provide substantial forward and rearward clearance for the keeper and less lateral clearance.

While in both forms of the invention herein shown, the keeper is mounted upon the lid and the pilot housing on the lower fixed part of the enclosure, a reversal of this arrangement may be employed if desired.

The disclosure herein is by way of example only and various modifications and changes in the details may be made without departing from the principles of the invention and the scope of the claims.

What I claim is:

1. In a latch for an alligator-type hood having upper and lower carrier members applied to the lid and the lower fixed part, a keeper in the form of a depending post or plunger applied to the upper carrier member, said keeper having an upwardly extending wall presenting an upwardly facing latching edge, a sheet metal keeper-receiving latch member applied to the lower carrier member and having a hollow centering and guiding body for the keeper extending upwardly toward the keeper and provided with a lateral extension at the side of said guiding body nearest said latching edge and communicating with said body, a pair of vertically swingable levers of different lengths mounted in said extension, one of said levers cooperating with said latching edge of the keeper to latch the lid in the fully closed position and the other cooperating with said edge to latch the lid in the safety position, springs connecting said levers with a fixed part of the assembly and biasing said levers toward their respective latching positions, a downwardly swingable releasing yoke pivoted on said extension below the pivotal axes of said levers, and a cross pin fixed to said yoke and engageable with said levers, whereby on releasing movement of said yoke said levers are withdrawn from the path of the keeper.

2. In a latch for an alligator-type hood having upper and lower carrier members applied to the lid and the lower fixed part, a keeper in the form of a depending post or plunger applied to the upper carrier member, said keeper having an upwardly extending wall presenting an upwardly facing latching edge, a sheet metal keeper-receiving latch member applied to the lower carrier member and having a hollow centering and guiding body for the keeper extending upwardly toward the keeper and provided with a lateral extension at the side of said guiding body nearest said latching edge and communicating with said body, a pair of vertically swingable levers mounted in said extension of different lengths, one of said levers cooperating with said latching edge of the keeper to latch the lid in the fully closed position and the other cooperating with said edge to latch the lid in the safety position, springs connecting said levers with a fixed part of the assembly and biasing said levers toward their respective latching positions, a downwardly swingable releasing yoke pivoted on said extension below the pivotal axes of said levers, and a cross pin fixed to said yoke having a pivotal and lost-motion connection with said one of said levers and having a camming action on the other lever, whereby on releasing movement of said yoke said levers are withdrawn from the path of the keeper, said levers being pivoted to said extension by a common pivoting member, said yoke being pivoted to said extension at the lower part of the latter and said yoke having said cross pin fixed thereto at the upper part of the yoke and below said common pivoting member.

3. In a latch for an alligator-type hood having upper and lower carrier members applied to the lid and the lower fixed part of the hood respectively, a keeper in the form of a depending plunger in fixed relation to the upper carrier member, said keeper having an upwardly extending wall presenting an upwardly facing latching edge extending longitudinally of the hood, a sheet metal keeper-receiving latch member in fixed relation to the lower carrier member having a hollow centering and guiding body for the keeper extending upwardly from the lower carrier member toward the keeper, said latch member having a lateral extension provided at the side thereof nearest said latching edge and communicating with said body, a pair of levers pivoted in said extension and swingable in a vertical plane transversely of the hood, the levers being of different lengths and being swingable into said body, the longer lever having a lower latching edge extensible across the latching edge of the keeper to latch the lid in the fully latched position, and the other lever having a downwardly facing latching edge extensible across the latching edge of the keeper to latch the lid in an upper or safety position, springs connecting said levers with a fixed part of the assembly and biasing said levers toward the respective latching positions, a vertically swingable releasing yoke pivoted to said extension below the pivotal axes of said levers and straddling the levers, and a cross pin fixed to said yoke and having a pivotal and lost-motion connection with the longer lever and having a camming action on the short lever, whereby on releasing movement of said yoke said levers are withdrawn from the path of the keeper, said cross pin being disposed above the pivotal axis of the yoke and below the pivotal axes of the levers.

4. In a latch for a hood of the alligator type, carrier members applied to the lid and the lower fixed part of the hood respectively, a keeper in the form of a plunger in fixed relation to one of said carrier members and extending toward the other member, said keeper having a vertically extending wall presenting a latching edge facing toward said one of the members and extending longitudinally of the hood, a keeper-receiving latch member in fixed relation to said other carrier member having a hollow centering and guiding body for the keeper extending from the last-mentioned carrier member toward the keeper, said latch member having a lateral extension provided at the side thereof nearest said latching edge and communicating with said body, a pair of levers pivoted in said extension and swingable in vertical planes transversely of the hood, the levers being of different lengths and being swingable into said body, the longer lever having a latching edge extensible across the latching edge of the keeper to latch the lid in the fully closed position thereof, and the other lever having a latching edge extensible across the latching edge of the keeper to latch the lid in an upper or safely position, springs connecting said levers with a fixed part of the assembly and biasing said levers toward the respective latching positions, a vertically swingable releasing yoke pivoted to said extension intermediate the pivotal axes of said levers and said other carrier member, said yoke straddling the levers, and a cross pin fixed to said yoke and having a pivotal and lost-motion connection with the longer lever and having a camming action on the short lever, whereby on releasing movement of said yoke said levers are withdrawn from the path of the keeper, said cross pin being disposed intermediate the pivotal axis of the yoke and the pivotal axes of the levers.

5. In a latch for a hood of the alligator type, upper and lower carrier members respectively applicable to the lid and to the lower fixed part of the hood structure, an elongate keeper fixed at one end to one of said members and projecting toward the other member, the keeper having adjacent the distal end thereof a marginal latching part facing toward said one of the members, a keeper-receiving latch member fixed to said other carrier member having a hollow centering and guiding body projecting from the last-mentioned member toward the keeper and provided with a lateral extension, a pair of vertically arranged latching levers having a common pivot mounting the levers on said extension, said levers being spring biased to their latched positions, and the levers being of different lengths and being swingable into said body independently of one another for cooperation with said latching part of the keeper, the longer lever having a latching portion cooperating with said latching part to latch the lid in a lower or fully latched position, and the other lever having a latching portion cooperating with said latching part to latch the lid in an upper or safety position, and a vertically swingable releasing yoke pivoted to said extension intermediate the lever axes and the other carrier member and straddling the levers, said yoke being provided with a cross pin engaging the levers on swinging movement of the yoke to withdraw said levers from the path of the keeper.

6. In a latch for a hood of the alligator type, upper and lower carrier members respectively applicable to the lid and to the lower fixed part of the hood structure, an elongate keeper fixed at one end to one of said members and projecting toward the other member, the keeper having adjacent the distal end thereof a marginal latching part facing toward said one of the members, a keeper-receiving latch member fixed to said other carrier member having a hollow centering and guiding body projecting from the last-mentioned member toward the keeper and provided with a lateral extension, a pair of vertically arranged latching levers pivoted to said extension for movement independently of one another and spring biased to their latched positions, the levers being swingable into said body at different levels for cooperation with said latching part of the keeper, one of the levers having a latching portion cooperating with said latching part to latch the lid in a lower or fully latched position, and the other lever having a latching portion cooperating with said latching part to latch the lid in an upper or safety position, and a vertically swingable releasing yoke pivoted to said extension intermediate the lever axes and the other carrier member and straddling the levers, said yoke being provided with a cross pin engaging the levers on swinging movement of the yoke to withdraw the levers from the path of the keeper.

7. In a latch for a hood of the alligator type, upper and lower carrier members respectively applicable to the lid and to the lower fixed part of the hood structure, an elongate keeper fixed at one end to one of said members and projecting toward the other member, the keeper having adjacent the distal end thereof a marginal latching part facing toward said one of the members, a keeper-receiving latch member fixed to said other carrier member having a hollow centering and guiding body projecting from the last-mentioned member toward the keeper and provided with a lateral extension, a pair of vertically arranged latching levers having a common pivot mounting the levers on said extension, said levers being spring biased to their latched positions, and the levers being of different lengths and being swingable into said body independently of one another for cooperation with said latching part of the keeper, the longer lever having a latching portion cooperating with said latching part to latch the lid in a lower or fully latched position, and the other lever having a latching portion cooperating with said latching part to latch the lid in an upper or safety position, and a vertically swingable releasing yoke pivoted to said extension intermediate the pivotal axes of said levers and said other carrier member and straddling the levers, and a cross pin fixed to the yoke and having a pivotal and lost-motion connection with the longer lever and having a camming action on the short lever, whereby on releasing movement of said yoke said levers are withdrawn from the path of the keeper, said cross pin being disposed intermediate the pivotal axis of the yoke and the pivotal axes of said levers.

8. In a latch for a hood of the alligator type, upper and lower carrier members respectively applicable to the lid and to the lower fixed part of the hood structure, an elongate keeper fixed at one end to one of the carrier members and projecting toward the other member, the keeper having adjacent the distal end thereof a marginal latching part facing toward said one of the members, a keeper-receiving housing fixed to said other carrier member and projecting from the latter toward the keeper, the housing providing a well confining the keeper on four sides throughout the greater part of the length of the latter and serving to guide the keeper relatively to the housing, so that when and as the lid is closed the lid is aligned with the lower fixed part of the hood prior to reaching the fully closed position, and the housing having a narrower lateral extension communicating with the well, a pair of vertically arranged latching levers parallel to one another and pivoted within said extension to swing into and out of said well at different levels independently of one another, one of the levers cooperating with said latching part of the keeper to latch the lid in a lower or fully latched position, and the other lever having a latching portion cooperating with said latching part to latch the lid in an upper or safety position, and a releasing member pivoted to the housing intermediate the lever axes and the other carrier member to swing in a vertical plane and carrying a cross pin intermediate the lever axes and the releasing member axis and engaging said levers to withdraw the same from the path of the keeper on swinging movement of the releasing member.

9. In a latch for a hood of the alligator type, upper and lower carrier members respectively applicable to the lid and to the lower fixed part of the hood structure, a keeper-receiving housing fixed to one of the carrier members and projecting from the latter toward the other of said members, the housing providing a well for confining a keeper on four sides throughout the greater part of the length of the latter and guiding the latter relatively to the housing so that when and as the lid is closed the lid is aligned with the lower fixed part of the hood prior to reaching the fully closed position, the housing having a narrower lateral extension communicating with the well, an elongate keeper having one end fixed to said other carrier member and projecting toward said housing, the keeper having two parallel walls spaced from one another and interconnected by a third wall facing and at the side nearest said extension, said third wall being provided with means defining a window, and a pair of vertically arranged latching levers pivoted within said extension to swing in and out of said window at different levels, one of the levers having a latching part engageable with the means defining the window to latch the lid in a lower or fully latched position, and the other lever having a latching part engageable with the last-mentioned means to latch the lid in an upper or safety position, and a yoke pivoted on an axis fixed in relation to the one carrier member in a position between the lever axes and the one carrier member to swing in a vertical plane and carrying a cross pin intermediate the lever axes and the yoke axis to engage the levers to withdraw the same from the path of the keeper on swinging movement of the yoke.

10. In a latch for a hood of the alligator type, carrier members applied to the lid of the lower fixed part of the hood respectively, a post-like keeper in fixed relation to one of said carrier members and extending toward the other member, said keeper having adjacent the distal end thereof a marginal latching part facing toward said one of the members, a cooperating latch member fixed to said other carrier member for receiving and guiding the keeper, the latch member having a lateral extension comprising a pair of fixed plate elements in parallel and spaced-apart relation to one another, a pair of levers pivoted in said extension intermediate said plate elements and swingable in vertical planes, the levers being of different lengths and having outer latching parts at different levers, the latching part of the longer lever being engageable with said latching part of the keeper to latch the lid in the lower or fully closed position thereof and the latching part of the other lever being engageable with the latching part of the keeper to latch the lid in an upper or safety position, and said levers being spring biased toward their latched positions, a vertically swingable releasing yoke pivoted to said plate elements and straddling the levers, and a cross pin fixed to said yoke and having a pivotal and lost-motion connection with the longer lever and having a camming action on the short lever, whereby on releasing movement of said yoke said levers are withdrawn from the path of the keeper, said cross pin being disposed intermediate the pivotal axis of the yoke and the pivotal axes of the levers.

11. In a latch for a hood of the alligator-type having upper and lower carrier members applied to the lid and the lower fixed part of the hood structure, a keeper fixed at one end to one of the members and projecting toward the other member, the keeper having a shank with a cup-shaped portion defining a latching edge facing said one member, a keeper-receiving latch member fixed to the other carrier member and having a hollow centering and guiding body projecting from the other carrier member toward the keeper, a pair of vertically arranged latching levers pivotally carried on an axis in fixed relation to the other carrier member, the levers being spring biased to their latched positions and swingable into the body at different levels for cooperation with the latching edge of the keeper, one of the levers having a latching portion cooperating with the latching edge to latch the lid in a fully latched position and the other lever having a latching position cooperating with the latching edge of the keeper to latch the lid in a safety position, and a vertically swingable releasing yoke pivoted on an axis fixed in relation to the other carrier member in a position between the lever axes and the other carrier member and straddling the levers, the yoke including a cross pin intermediate the lever axes and the yoke axis and engaging the levers upon swinging movement of the yoke to withdraw the levers from the path of the keeper.

References Cited in the file of this patent

UNITED STATES PATENTS

| | | |
|---|---|---|
| 1,558,258 | Flinchbaugh | Oct. 20, 1925 |
| 1,733,128 | Mauborgne | Oct. 29, 1929 |
| 1,808,265 | Smith | June 2, 1931 |
| 1,958,731 | Voegelein | May 15, 1934 |
| 2,199,467 | Saunders | May 7, 1940 |
| 2,199,468 | Saunders | May 7, 1940 |
| 2,211,217 | Peterson | Aug. 13, 1940 |
| 2,302,957 | Rhodes | Nov. 24, 1942 |
| 2,439,549 | Quigley | Apr. 13, 1948 |
| 2,446,934 | Krause | Aug. 10, 1948 |
| 2,559,736 | Scarborough | July 10, 1951 |
| 2,569,044 | Endter | Sept. 25, 1951 |
| 2,756,086 | Wade | July 24, 1956 |

FOREIGN PATENTS

| | | |
|---|---|---|
| 614,974 | France | Dec. 27, 1926 |
| 679,097 | France | Apr. 8, 1930 |

UNITED STATES PATENT OFFICE
CERTIFICATE OF CORRECTION

Patent No. 2,884,275                               April 28, 1959

Arthur Claud-Mantle

It is hereby certified that error appears in the printed specification of the above numbered patent requiring correction and that the said Letters Patent should read as corrected below.

Column 3, line 64, for "was" read -- has --; column 5, line 24, for "68$^a$" read -- 68$^b$ --; column 9, line 47, for "safely" read -- safety --; column 12, line 5, for "levers" read -- levels --.

Signed and sealed this 1st day of September 1959.

(SEAL)

Attest:

KARL H. AXLINE
Attesting Officer

ROBERT C. WATSON
Commissioner of Patents